United States Patent
Bissett et al.

[11] 3,903,736
[45] Sept. 9, 1975

[54] SERVICE COMPUTER USING ELECTROLYTIC CELL STORAGE MEMBER

[75] Inventors: Thomas B. Bissett, Malibu; Martin S. Tatch, West Los Angeles, both of Calif.

[73] Assignee: The Bissett-Berman Corporation, Los Angeles, Calif.

[22] Filed: Sept. 26, 1969

[21] Appl. No.: 861,518

Related U.S. Application Data

[63] Continuation of Ser. No. 561,817, June 30, 1966, abandoned.

[52] U.S. Cl. ............ 73/117.3; 324/182; 340/309.1
[51] Int. Cl. ...................... G01m 15/00; G04f 9/00
[58] Field of Search ............ 324/68 ET, 94; 73/116, 73/117.3; 340/52, 267, 309.1, 309.4

[56] References Cited
UNITED STATES PATENTS

| | | | |
|---|---|---|---|
| 2,655,634 | 10/1953 | Kroko | 324/182 |
| 3,290,669 | 12/1966 | Mews | 340/267 |
| 3,343,083 | 9/1967 | Beusman | 324/182 X |
| 3,357,239 | 12/1967 | Hohenberg | 73/116 |
| 3,362,217 | 1/1968 | Evans et al. | 73/116 |
| 3,423,648 | 1/1969 | Mintz | 324/94 X |

FOREIGN PATENTS OR APPLICATIONS 688,640   6/1964   Canada

*Primary Examiner*—Alfred E. Smith
*Attorney, Agent, or Firm*—Ellsworth R. Roston

[57] ABSTRACT

The present invention is directed to an apparatus for monitoring the wear on an article such as the wear on an engine and wherein the wear on the article is related to a particular function such as the engine rotations. The present invention includes means for producing an output signal having characteristics in accordance with the particular wear function and for applying this output signal through an electrolytic storage cell for transferring particular amounts of an active material between electrodes in the electrolytic storage cell so as to store information in accordance with the output signal. The present invention also includes the use of more than one input to the electrolytic storage member.

5 Claims, 4 Drawing Figures

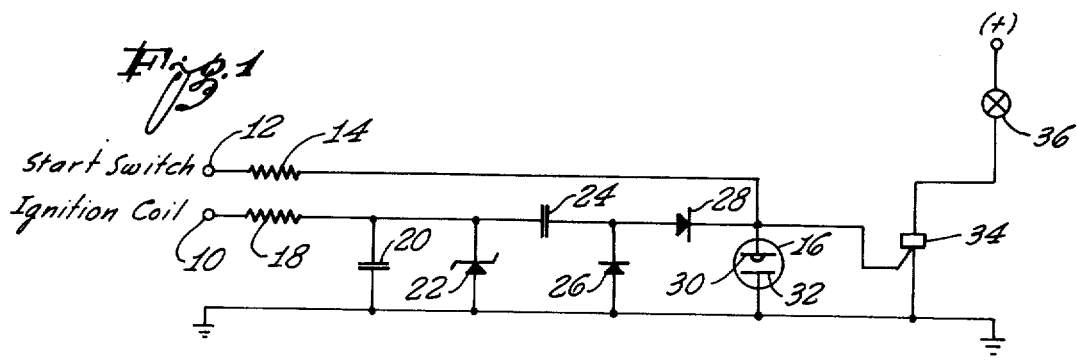
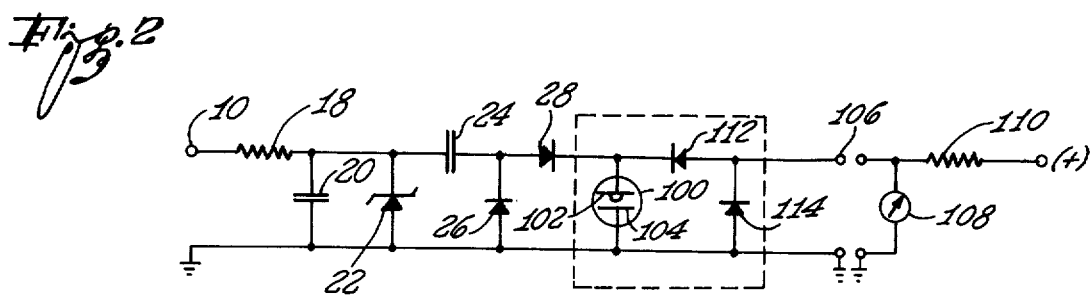
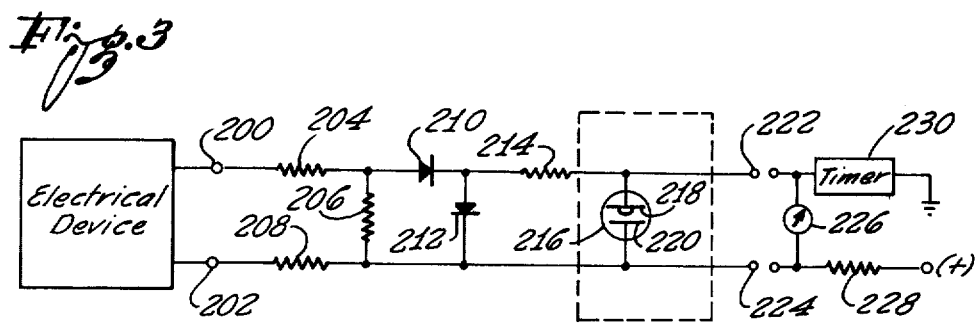
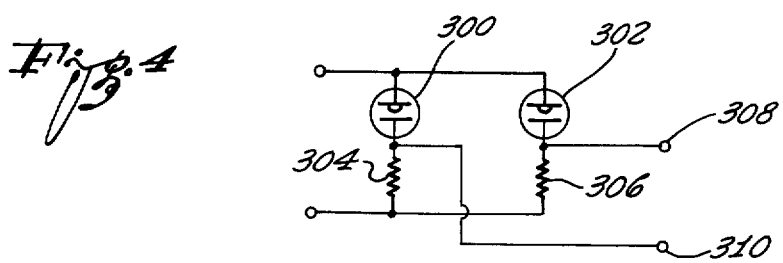

SERVICE COMPUTER USING ELECTROLYTIC CELL STORAGE MEMBER

This is a continuation of application Ser. No. 561,817 filed June 30, 1966, now abandoned.

This invention relates to a structure for providing a monitoring function. In addition, the present invention relates to a monitoring apparatus which may perform a computing process and which includes an electrolytic cell as a storage medium. Specifically, the monitoring apparatus of the present invention may be constructed to operate as a warranty monitoring device or to operate as a service computer.

There has been a need for a small, inexpensive device to provide for a monitoring of functions relating to a particular article. For example, the monitoring apparatus of the present invention may provide a measurement of a function or functions related to the wear on a particular article so as to provide an indication of the wear on the particular article. As a specific example, the wear on an automobile may be related to the revolutions of the engine, the number of starts of the engine, the temperature conditions at which the engine of the automobile is operated, the road conditions over which the automobile is driven, etc. The wear on an electric switch may be determined by the number of operations which the switch performs.

Generally, with devices which have moving parts, the wear may be related to the number of movements of these moving parts. It is to be appreciated, however, that the wear on an article does not have to be related to the movement of a particular member but may be related to some outside physical condition which has a direct influence on the article. For example, in the shipment of perishable goods such as fruit over long distances, the wear on the perishable goods is determined to a large extent by the temperature conditions under which the perishable goods are maintained during shipment. The wear on the perishable goods, therefore, is directly related to temperature and temperature is the condition which may be monitored to determine the wear. The temperature may be monitored as a continuous function or the temperature may only be monitored when the temperature is above a predetermined value.

Other types of wear may also be monitored in accordance with predetermined conditions which affect an article. For example, in a broad sense, the wear on a human being who works in an environment where the human being is subjected to nuclear radiation would be in accordance with the amount of radiation to which the human being is subjected. The present invention, may, therefore, monitor the radiation and store information relating to the amount of radiation to which the human being is subjected or provide an indication when the human being has received a particular amount of radiation.

The present invention may be considered to be more than a monitoring device which may provide an indication when a particular condition is reached. The present invention is actually a small computer which either stores information which may be retrieved at a later time or which may be used to provide an indication when a particular level of storage is reached. In addition, the present invention may be pre-programmed so as to provide for an indication in accordance with the pre-programming of the monitoring device.

As indicated above, the monitoring apparatus of the present invention may monitor the operation of an automobile and may, in particular, monitor the operation of the automobile while in service. The present invention will be explained in this application with reference to the monitoring of the operation of an automobile but it is to be appreciated that other articles may be monitored as was indicated above.

In the monitoring of the operation of an automobile, the present invention may be pre-programmed so as to give an indication, such as a light on the dashboard, when service of the automobile is required. The form of the present invention which provides both a monitoring and an indication function is designated as a service computer. The monitoring apparatus of the present invention may also be used in an automobile to provide a warranty function and may be used to provide a warranty function which is more accurate than the mileage type of warranty which is presently used in the automobile industry. When the monitoring device of the present invention is used to provide a warranty function, it is designated as a warranty monitor. The warranty monitor of the present invention may be designated so that it cannot be tampered with so that the automobile dealer or manufacturer has a reliable indication as to whether the automobile is still within the warranty period.

The present servicing of automobiles is usually performed at some set mileage interval. For example, a manufacturer may suggest that the automobile be serviced every 6,000 miles. This is at best a bad compromise since it does not adjust to the individual conditions at which different automobiles are operated. For example, some automobiles should be serviced at more frequent intervals. A more frequent servicing is desirable when an automobile is driven with many starts and stops, such as occurs with city driving. Also, an automobile should be serviced more frequently if it is operated often at cold temperature conditions. In addition, the operation of the automobile over rough terrain demands more frequent servicing of the automobile.

Although some automobiles should be serviced at more frequent intervals than the manufacturer's suggested interval as indicated above, it is also true that some automobiles may be serviced at less frequent intervals. For example, if the automobile is used mainly for long trips with few starts and stops, this generally results in less wear on the automobile. Also, the operation of the automobile in a warm climate and on smooth roads demands less servicing of the automobile. The service computer of the present invention can be designed to have various inputs which may monitor many functions so as to determine when service is required in accordance with the individual needs of each particular automobile.

The monitoring device of the present invention and of the specific construction of a service computer or a warranty monitor uses a storage medium such as an electrolytic cell storage member of the type shown in copending application Ser. No. 519,634 filed Jan. 10, 1966, now Pat. No. 3,423,648, listing Martin Mintz as the inventor and assigned to the assignee of the instant application. In the copending application, an electrolytic cell is disclosed which includes a first inner electrode which has a layer of inert material which may or may not be plated with a predetermined amount of active material. The second electrode is formed of active material and, as shown in the copending application, the second electrode surrounds the first electrode.

When current flows through the electrolytic cell, active material on the first electrode may be stripped from the first electrode and deposited on the second electrode in accordance with a first direction of current flow or active material may be stripped from the second electrode and deposited on the first electrode in accordance with a second opposite direction of current flow.

When there is active material on both the first and second electrodes, the resistance across the electrolytic cell is low. When all of the active material has been stripped from one electrode and deposited on the other electrode, the resistance across the electrolytic cell is high relative to the resistance across the cell when there is active material on both electrodes. The change in the resistance of the electrolytic cell may be used to provide an indication and such indication may be used with the service computer of the present invention or may be used with the warranty monitor of the present invention.

The stripping of the active material from one electrode and depositing the material on the other electrode is proportional to the current flowing in the electrolytic cell, and such stripping of the active material may be used to provide a storage function in the monitoring device of the present invention. In addition, the amount of active material which is stripped from one electrode and deposited on the other electrode is in accordance with the current flow and also in accordance with the length of time that the current flows through the electrolytic cell. Predetermined amounts of the active material, therefore, may be plated on the first electrode and the operation of an automobile may be monitored by stripping small amounts of this active material from the first electrode in accordance with the use of the automobile so as to provide an indication when all of the active material is stripped from the first electrode. For example, the service computer of the present invention may monitor the operation of the automobile by measuring the number of revolutions or number of firings of the automobile engine and with a stripping of small amount of active material in accordance with each revolution or firing of the engine.

When the first electrode is plated with a predetermined amount of active material, this predetermined amount may be set to be equivalent to a particular number of revolutions or firings of the automobile engine. When the engine revolves the particular number of times or when the engine fires the particular number of times, all of the active material is stripped from the first electrode. When all the active material is stripped from the first electrode, the resistance of the electrolytic cell changes from a low resistance to a high resistance. The change in resistance is used to provide an indication that the engine has undergone a particular number of revolutions or firings. The particular number of revolutions or firings may be preset to be equivalent to a proper service interval for the automobile. Also, the number of revolutions or firings of the engine may be preset in accordance with the predetermined amount of active material so as to provide for a warranty period by the manufacturer. For example, the automobile may be warranted for operation by the manufacturer for a particular number of revolutions of the engine.

When the service computer of the present invention is used to provide an indication that service is required, as explained above, it may be desirable to provide additional input information to the service computer other than the number of revolutions or firings of the engine. It is to be appreciated, however, that the number of revolutions or firings of the engine is a better indication of a proper service interval than the mileage interval presently used. For example, if the automobile is used mainly for city driving, there will be many instances of the automobile idling at red lights and stop signs and this is measured by the service computer of the present invention. The idling periods of the automobile, of course, are not reflected by a mileage change on the odometer. It is, therefore, apparent that the use of the automobile mainly for city driving results in a more frequent servicing than the use of the automobile for long distance driving when the service computer of the present invention is incorporated in the automobile. This is a more desirable approach since automobiles which are used in the city do require more frequent servicing.

It may also be desirable to provide other inputs to the service computer of the present invention as indicated above so as to provide a more accurate determination of the operating conditions of the automobile. For example, an additional input to the service computer may be provided each time the automobile is started. It is known that an automobile which is used for many short trips with frequent starting requires greater service than an automobile which is used for longer trips. Also, in the starting of the automobile, greater wear is experienced by the engine.

Another additional input which may be provided for the service computer of the present invention is related to the temperature conditions under which the automobile is operated. For example, one of the above mentioned inputs to the service computer of the present invention may include a temperature sensitive element such as a temperature sensitive resistor so as to provide variations in the information in accordance with the temperature. For example, the start input to the service computer may include a temperature-sensitive resistor which would provide a greater current flow through the electrolytic cell when the automobile is started under cold conditions than when the automobile is started under warm conditions. Also, the input to the service computer which provides information relating to the revolutions or firings of the engine may also include a temperature-sensitive resistor so as to provide greater current to the electrolytic cell storage device when the automobile is operated at cold temperatures.

It is also possible to provide other types of input information to the service computer of the present invention so as to incorporate additional factors which affect the wear of the automobile. For example, the operation of the automobile over rough roads provides a greater wear factor for the automobile and the automobile should be checked and serviced more frequently when operated on such rough roads. The use of the automobile on rough roads may be checked by monitoring the suspension system of the automobile. For example, the suspension system of the automobile may be monitored by using a device which provides an electrical output in response to the activity of the suspension system. An ordinary phonograph cartridge may be adapted to provide such an electrical output and such output signal may be coupled to the service computer of the present invention so as to provide an additional input in accordance with the activity of the suspension system. It is apparent that other such inputs may be used to provide other factors related to the operation of the automobile.

The monitoring device of the present invention may also be used as a warranty monitor. The automobile manufacturers have a problem in that it is difficult to determine reliably when the warranty period is over. For example, a typical automobile warranty period runs for 24 months or 24,000 miles, whichever is sooner. The time portion of the warranty period, that is the 24-month portion, is simple to determine because the automobile manufacturer or dealer has a record of when the automobile was sold. However, the mileage portion of the warranty period is more difficult to determine since the odometer may be easily turned back. For example, if the automobile is used very frequently, the 24,000-mile period occurs within the 24-month period and the automobile should be out of warranty. However, when such a high mileage results in a short period of time, there is a great temptation to turn back or disconnect the odometer so that the automobile may appear to be still within the warranty period.

The odometer may be turned back by the first or second owner of the automobile or the odometer may be turned back by an automobile dealer in order to enhance the resale value of the automobile. In any event, when the odometer is turned back, the automobile appears to be within the warranty period and the manufacturer is, therefore, obligated to make replacements to parts covered by the warranty which wear out during the period.

It is, therefore, desirable to provide a more reliable and a tamper-proof means of determining the warranty period for an automobile. The present invention may be used to provide a warranty monitor which provides a new concept for an automobile warranty period. For example, the automobile warranty period may be a period of time such as 24 months plus a particular number of revolutions of the automobile engine. The warranty monitor, therefore, includes an electrolytic cell storage device of the type described above which has been pre-stored with a particular amount of active material on one electrode and wherein this particular amount of active material is related to the warrantied number of revolutions of the automobile engine.

The warranty monitor of the present invention is designed so that the circuit cannot be reversed so as to restore active material once it has been stripped from the one electrode. As the automobile is operated, small amounts of the active material are stripped from the one electrode with each revolution of the engine and transferred to the other electrode. When both electrodes contain active material, there is a low resistance across the electrolytic cell. When all of the active material is stripped from the one electrode, the resistance across the electrolytic cell rises to a high resistance. It is, therefore, easy to determine when the warranty period is up since the resistance across the electrolytic cell is a measurement of whether there is still active material remaining on the one electrode and, therefore, whether there is time remaining in the warranty period.

The measurement of the warranty may consist of either a yes-no type of indication that the automobile is or is not still in warranty or the warranty measurement may actually be a measurement of the amount of time left in the warranty period. The present invention contemplates warranty monitors which provide a measurement of a warranty period related to the number of revolutions of the automobile engine or some other periodic function of the automobile and wherein this warranty monitor may be used to provide an indication of whether the automobile is or is not within the warranty period or may be used to provide an indication of the amount of time remaining in the warranty period. It is to be appreciated, as indicated above, that the warranty period may be determined by a factor other than the revolutions of the automobile engine. For example, the revolutions of the drive shaft of the automobile may be used to provide the warranty period.

It can be seen from the above that the present invention is generally related to a monitoring device which may be used to provide measurement of the wear of an article in accordance with the monitoring of particular functions which are related to the wear on the particular article.

A clearer understanding of the invention will be had with reference to the drawings wherein:

FIG. 1 is a circuit diagram of a service computer which may be used within an automobile;

FIG. 2 is a circuit diagram of a warranty monitor which may be used within an automobile;

FIG. 3 is a circuit diagram of a warranty monitor or a time elapsed indicator which may be used to provide an indication from an alternating electrical signal; and FIG. 4 is an alternate configuration for the electrolytic cells which may be used in place of the dotted portions of FIGS. 2 and 3.

In FIG. 1, a circuit diagram of a service computer which may be used in an automobile is illustrated. The service computer of FIG. 1 includes a pair of terminals 10 and 12. The low voltage side of the ignition coil within the automobile may be connected to the terminal 10 so as to provide a pulsating voltage in accordance with the firing of the automobile engine as an input signal to the terminal 10. Terminal 12 may have coupled to it a connection from the ignition switch in the automobile. In particular, a connection from the start portion of the ignition switch may be coupled to terminal 12 so that terminal 12 receives a voltage whenever the ignition switch is turned to the start position. The input signal coupled to the terminal 12 is then applied through a resistor 14 to one terminal of an electrolytic cell 16. The resistor 14 may be sensitive to temperature so as to provide for a greater or lesser current flow through the resistor 14 to the electrolytic cell 16 in accordance with the temperature. The temperature-sensitive resistor 14 may be used to provide a greater current to the electrolytic cell 16 during cold starts.

The input signal coupled to the terminal 10 is applied through a resistor 18 and a capacitor 20 which operate as a low-pass filter so as to eliminate any high-frequency variations in the voltage from the ignition coil. In addition, the resistor 18 may be temperature-sensitive so as to vary the current in accordance with the temperature conditions so as to provide a greater current when the engine is operating at a cold temperature. The output from the low-pass filter is applied across a diode 22, which may be a Zener diode, so as to provide a regulation of the signal from the low-pass filter. The output from the Zener diode is, therefore, a fixed amplitude voltage pulse having a frequency in accordance with the frequency of the revolutions of the engine and having a pulse width in accordance with the values of the resistor 18 and the capacitor 20.

The pulse output signal from the diode 22 is then coupled through a coupling capacitor 24 which blocks the passage of any DC current. A pair of diodes 26 and 28 are used to insure a proper direction of current flow through the electrolytic cell 16. For example, the diode 26 bypasses any voltage appearing between the terminal 10 and ground which may be of the wrong polarity. In addition, the diode 28 insures that the current flowing to the electrolytic cell 16 from the resistor 14 is not dissipated in portions of the circuit other than the electrolytic cell 16.

The electrolytic cell 16 includes a pair of electrodes 30 and 32. Electrode 30 is at least partially composed of an inert material which has been coated with a predetermined amount of an active material. The currents flowing into the electrode 30 from the original input signals to the terminals 10 and 12 provide a stripping of the active material from the electrode 30 with a transfer of the active material to the electrode 32. The stripping of the active material from the electrode 30 is in accordance with the revolutions or firings of the automobile engine as determined by the input signal coupled to the terminal 10, and in accordance with the starting of the automobile engine as determined by the input signal coupled to the terminal 12.

While active material remains on the electrode 30, the electrolytic cell has a relatively low resistance. When all of the active material has been stripped from the electrode 30, the electrolytic cell 16 has a high resistance. The voltage across the electrolytic cell 16 is, therefore, in accordance with the resistance of the cell. The voltage across the electrolytic cell 16 is used to provide a control of a switch 34 which may be a silicon-controlled switch. When there is active material on the electrode 30 and the resistance of the electrolytic cell 16 is low, the voltage across the electrolytic cell is not sufficient to provide a switching of the silicon-controlled switch 34.

When all of the active material is stripped from the electrode 30 and deposited on the electrode 32, the resistance of the electrolytic cell 16 rises and the voltage across the cell also rises. At the time the resistance of the electrolytic cell 16 initially increases due to the stripping of all of the active material from the electrode 30, the silicon-controlled switch 34 is not immediately activated. The silicon-controlled switch is not immediately activated because the signal coupled to the electrolytic cell 16 is only from the terminal 10 and this does not supply sufficient current to provide a switching of the silicon-controlled switch 34. The next time the engine is started, the signal applied to the electrolytic cell 16 includes a a start signal from the terminal 12 which does provide sufficient current to switch the silicon-controlled switch 34 so that the silicon-controlled switch 34 acts as a short circuit.

When the silicon-controlled switch 34 is activated a circuit including a light 36 is completed and the light 36 glows, indicating that service of the automobile is required. The light 36 may be mounted on the dashboard of the automobile so as to be visible to the operator of the automobile. The light 36 will be maintained in an on condition even after the input signal from the terminal 12 is discontinued so long as the ignition switch remains on, since the load current through the light 36 maintains the switch in a latched or conducting state. When the automobile engine is turned off, the light 36 is extinguished and does not go on until the engine is again started. The light on the dashboard provides an indication that the car is ready for servicing. The light is a constant reminder each time the automobile is driven that the servicing of the automobile is due and the light cannot be extinguished until the car is brought in to the dealer for servicing. When the dealer performs all of the required servicing he replaces the electrolytic cell 16 with a new electrolytic cell which includes a predetermined amount of active material on one of the electrodes so as to predetermine the next service interval.

FIG. 2 illustrates a warranty monitor for use in an automobile which has certain elements similar to that shown in FIG. 1 and like elements are given like reference characters. In FIG. 2, an input signal from the low-voltage side of the ignition coil is coupled to a terminal 10 and through a low-pass filter including a resistor 18 and a capacitor 20. The circuit of FIG. 2 also includes the Zener diode 22, the coupling capacitor 24 and the pair of diodes 26 and 28. The circuitry described above provides a pulsating signal having a fixed voltage and having a frequency of pulsation in accordance with the revolutions of the engine and having a pulse width in accordance with the values of the resistor 18 and the capacitor 20.

The pulsating signal is applied to an electrolytic cell 100 which includes a first electrode 102 and a second electrode 104. The electrode 102 is deposited with a predetermined amount of an active material and this active material is stripped from the first electrode 102 and deposited on the electrode 104 in accordance with the signal applied to the terminal 10. The predetermined amount of the active material which is deposited on the first electrode 102 is related to a particular number of revolutions of the automobile engine. The automobile manufacturer, therefore, warrants the automobile for a particular number of revolutions of the engine. When all of the active material is stripped from the electrode 102 and deposited on the electrode 104, the automobile is now considered to be out of warranty and the manufacturer is no longer liable for warranted parts which may require replacement.

In order to determine whether the automobile is or is not still within the warranty period, a terminal 106 is provided. The terminal 106 is used to provide the measurement as to whether all of the material has been stripped from the electrode 102. The measurement is accomplished with a voltmeter 108 which is part of a voltage divider circuit which includes an auxiliary resistor 110 and the electrolytic cell 100. A pair of diodes 112 and 114 are provided between the electrolytic cell 100 and the terminal 106 so that the measurement may be taken but also so that active material cannot be replated from the electrode 104 to the electrode 102, thereby turning back the warranty monitor. When the measuring unit is connected to the proper terminals, the diode 112 allows current flow only in one direction. If an attempt is made to replate the electrode 102 with active material from electrode 104, the diode 114 will bypass such an attempt.

The measurement of whether the automobile is still within the warranty period is accomplished by applying a voltage to one side of the resistor 110. The other side of the resistor 110 is effectively coupled to the first electrode 102 through the diode 112. The resistor 110 and the electrolytic cell 100, therefore, provide a voltage divider circuit and a voltmeter 108 is connected across the electrolytic cell 100. When active material is still present on the first electrode 102, the electrolytic cell 100 has a low resistance and the voltmeter 108 measures a low voltage. When all of the active material is stripped from the first electrode 102, the electrolytic cell 100 has a relatively higher resistance and the voltmeter 108 measures a low voltage. When all of the active material is stripped from the first electrode 102, the electrolytic cell 100 has a relatively higher resistance and the voltmeter 108 provides a relatively higher voltage reading. The automobile dealer may, therefore, have an instrument with a green and a red area wherein the green area is at the low voltage portion of the meter to indicate to the automobile dealer that the automobile is still in warranty and wherein the red portion is at the high voltage portion of the meter to indicate that the automobile is no longer in warranty.

The use of the diode 114 to provide a bypass eliminates the possibility of tampering with the circuit of FIG. 2 so as to replate material from the electrode 104 onto the electrode 102 and therefore extend the warranty period. The circuit of FIG. 2 may also be sealed as a unit at a position within the automobile so that any tampering with the unit would be obvious. The warranty meter of FIG. 2, therefore, is a relatively foolproof and inexpensive way of determining when the warranty period of an automobile is still in force. The warranty meter of FIG. 2 also provides means so that the warranty period may not be extended in contrast with the current practice of turning back the odometer to extend the warranty period.

FIG. 3 illustrates an elapsed time indicator which may be used to measure the wear of any device which incorporates an alternating current, for example, an electric typewriter, an electric clock, an electric generator or motor, a computer, an electric switch, any electric household appliance, etc. The alternating current is applied to a pair of terminals 200 and 202. Three resistors 204, 206 and 208 all having a high resistive value act as a voltage divider circuit and are used to provide isolation when the voltage across the terminals 200 and 202 has a high value. These resistors may be replaced with a transformer, if desired. The voltage across the resistor 206 is, therefore, greatly reduced in value.

The alternating signal from the voltage dividing circuit is then applied through a pair of diodes 210 and 212. Diode 210 acts as a halfwave rectifier so as to eliminate one-half of the alternating wave and provide a pulsating signal of single polarity. Diode 212 acts as a clipping diode so as to clip the pulsating signal and essentially provide a square wave at the terminal between the diodes 210 and 212. A resistor 214 is chosen to have a value so as to provide the desired current value which is to be applied to the electrolytic cell 216.

The electrolytic cell 216 includes a first electrode 218 and a second electrode 220. In the circuit of FIG. 3, the electrode 218 initially contains all of the active material which is present within the electrolytic cell 216 and the electrode 220 has an exposed layer of inert material which is to receive the active material. As the electric device is used, the alternating current is coupled to the terminals 200 and 202. The electrolytic cell 216, therefore, has a current applied through it in accordance with the time that the electrical device is in use. The current is in a direction to strip active material from the electrode 218 and deposit it on the electrode 220. The stripping of the active material continues as long as the electrical device is in use so as to provide a continuous measurement of the use of an electrical device and therefore provide a measurement of the wear of the electrical device.

A pair of outside terminals 220 and 224 are provided so as to determine how long the electrical device has been in use. The measurement of the time the electrical device has been in use is provided by a circuit which includes a voltmeter 226, a resistor 228 and a timer 230. The circuit is coupled across the terminals 222 and 224 as shown and current is applied to the resistor 228 so as to flow through the electrolytic cell 216 in a direction opposite to the current flow when the circuit of FIG. 3 is measuring the use of the electrical device. The active material is therefore stripped from the electrode 220 and redeposited on the electrode 218. The time for redeposition of the active material is determined by the timer 230. In addition, a voltmeter 226 is applied across a voltage divider circuit including the resistor 228 and the electrolytic cell 216. As long as active material is present on both electrodes 220 and 218, the resistance of the electrolytic cell 16 is low. When all of the active material has been redeposited on the electrode 218, the electrolytic cell 216 changes to a high resistance.

When the voltmeter 226 measures a high voltage this indicates that all of the active material has been deposited on the electrode 218. The time that it takes to redeposit all of the material on the electrode 218 is proportional to the time that the electrical device has been in use. It is usually desirable to redeposit the active material much faster than the original stripping from the electrode 218, but the relationship between the current flowing when the electrical device is in use and the current flowing to redeposit the active material on the electrode 218 is a constant predetermined factor. The elapsed time indicator of FIG. 3, therefore, may be used to provide a direct measurement of the wear on an electrical device which incorporates an alternating current.

It is to be appreciated that the elapsed time indicator of FIG. 3 may also be used with a device which incorporates a direct current. When using a direct current it is not necessary to provide for rectification and clipping as is provided with an alternating current system of FIG. 3.

FIG. 4 illustrates an electrolytic cell arrangement which may be used in place of the electrolytic cell arrangements of FIGS. 2 and 3. Specifically, the arrangement of FIG. 4 may be used in place of the dotted portions shown in FIGS. 2 and 3. The electrolytic cell arrangement of FIG. 4 includes a pair of electrolytic cells 300 and 302 which are in a parallel relationship during monitoring and are in a series relationship during readout. In addition, a pair of resistors 304 and 306 are provided to complete the circuit.

When the electrolytic cell arrangement of FIG. 4 is used in place of the electrolytic cell arrangement of FIG. 2, the electrolytic cells 300 and 302 both have electrodes plated with a predetermined amount of material. The measurement of the warranty period when the electrolytic cell arrangement of FIG. 4 is used in combination with the circuit of FIG. 2 may be either an on-off indication as shown in FIG. 2 or a timer as shown in FIG. 3 may be used to provide an indication of the amount of time remaining in the warranty period.

When the arrangement of FIG. 4 is used to provide an on-off indication so as to determine whether the automobile is still in warranty as shown with FIG. 2, the measuring circuit including the resistor 110 and the voltmeter 108 is applied to the outside terminals 308 and 310 shown in FIG. 4.

When there is active material remaining on both of the electrodes of any one of the cells, the overall resistance of the electrolytic cells 300 and 302 is relatively low. When all of the active material is stripped from the first electrodes of both electrolytic cells, the overall resistance is relatively high so as to provide a high voltage indication. The electrolytic cell arrangement of FIG. 4 is nondestructive and tamper proof in that as current is applied in one direction so as to replate one electrolytic cell, active material is stripped from the other electrolytic cell. Therefore, what is replated in one electrolytic cell is stripped from the other electrolytic cell so the overall combination of plated active material is the same for both electrolytic cells.

The electrolytic cell arrangement of FIG. 4 may also be measured with the timing circuit shown in FIG. 3 which includes a resistor 228, a voltmeter 226 and a timer 230 by coupling the timing circuit across the output terminals 308 and 310 shown in FIG. 4. The current is applied to transfer active material back to the first electrode in one electrolytic cell and to strip from the other electrolytic cell. When all of the active material is stripped from the first electrode of one of the electrolytic cells, the voltmeter 226 will show a jump in voltage. When the voltmeter 226 shows a jump in voltage, the time that has been measured will be the time remaining in warranty if the electrolytic cells of FIG. 4 have been set to provide a warranty function.

When the electrolytic cells of FIG. 4 are merely used to measure elapsed time, no active material is preplated. As the electrical device, such as the electrical device of FIG. 3, is used, active material is plated to the inert layer in both electrolytic cells. The measurement of time is accomplished by using the timing circuit of FIG. 3 as described above. One of the advantages of the circuit of FIG. 4 is that it is impossible to tamper with the circuit since reversal of current merely strips additional material from the first electrode in one of the electrolytic cells while the other electrolytic cell is being replated. The overall combination, however, remains the same.

It can be seen from the above that the present invention is directed to monitoring apparatus which may provide a computer function. The monitoring apparatus may measure elapsed time or provide a warranty period or, in addition, be predetermined to provide a service indication to the user of a piece of equipment. Specifically, the invention has been described with reference to an automobile service computer or a warranty monitor and an elapsed time indicator for an electrical device. It is to be appreciated that other articles may be monitored in accordance with the invention and that the invention, therefore, is only to be limited by the appended claims.

We claim:

1. A computer for determining a function of the wear imposed upon an engine rotatable at a variable speed, including:

first means responsive to the rotations of the engine for producing a first current output having variable characteristics in accordance with variations in the rotational speed of the engine;

second means responsive to the starting of the engine for producing a second current output having particular characteristics representing each start of the engine;

an electrolytic cell having first and second electrodes and with the first electrode constructed to store a particular material and with the first electrode disposed relative to the second electrode to transfer variable amounts of the particular material to the second electrode upon the introduction of the first and second current outputs to the second electrode and with the variable amount transferred in accordance with the variable characteristics of the first and second current outputs;

third means operatively coupled to the first means and the electrolytic cell for introducing the first current output from the first means to the electrolytic cell; and fourth means operatively coupled to the second means and the storage member for introducing the second current output from the second means to the electrolytic cell.

2. The computer set forth in claim 1 wherein the first means is constructed to produce the first current output only in a particular direction in accordance with the rotations of the engine.

3. The computer set forth in claim 2 wherein the first means is constructed to produce the firstcurrent output with a particular maximum limit in accordance with the rotations of the engine.

4. The computer set forth in claim 1 wherein the second means is responsive to variations in the temperature of the engine to adjust the characteristics of the current output from the second means in accordance with such temperature variations.

5. The computer set forth in claim 1 wherein the first means is responsive to variations in the temperature of the engine to adjust the characteristics of the current output from the first means in accordance with such temperature variations.

* * * * *